(12) United States Patent
Takeyama (10) Patent No.: US 10,483,584 B2
(45) Date of Patent: Nov. 19, 2019

(54) FUEL CELL DEVICE

(71) Applicant: TOYOTA JIDOSHA KABUSHIKI KAISHA, Toyota-shi, Aichi-ken (JP)

(72) Inventor: Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 466 days.

(21) Appl. No.: 14/933,375

(22) Filed: Nov. 5, 2015

(65) Prior Publication Data

US 2016/0133982 A1 May 12, 2016

(30) Foreign Application Priority Data

Nov. 6, 2014 (JP) ................................ 2014-225762

(51) Int. Cl.
| | |
|---|---|
| *H01M 8/24* | (2016.01) |
| *H01M 8/247* | (2016.01) |
| *H01M 8/2475* | (2016.01) |
| *H01M 8/248* | (2016.01) |
| *H01M 8/1018* | (2016.01) |

(52) U.S. Cl.
CPC ........... *H01M 8/247* (2013.01); *H01M 8/248* (2013.01); *H01M 8/2475* (2013.01); *H01M 2008/1095* (2013.01)

(58) Field of Classification Search
CPC ................. H01M 8/247–8/248; H01M 8/2475
See application file for complete search history.

(56) References Cited

U.S. PATENT DOCUMENTS

| | | | |
|---|---|---|---|
| 2002/0034673 A1* | 3/2002 | Bisaka | H01M 8/248 429/454 |
| 2004/0121216 A1 | 6/2004 | Blanchet | |
| 2007/0184330 A1* | 8/2007 | McLean | H01L 23/373 429/421 |
| 2010/0055525 A1 | 3/2010 | Uematsu et al. | |
| 2012/0264032 A1* | 10/2012 | Watanabe | H01M 8/242 429/467 |
| 2014/0147769 A1 | 5/2014 | Takeyama | |
| 2016/0126563 A1* | 5/2016 | Hotta | H01M 8/0202 429/468 |

FOREIGN PATENT DOCUMENTS

| | | |
|---|---|---|
| CA | 2 838 923 A1 | 1/2013 |
| CN | 103620848 A | 3/2014 |

(Continued)

*Primary Examiner* — Stephan J Essex
(74) *Attorney, Agent, or Firm* — Finnegan, Henderson, Farabow, Garrett & Dunner, LLP (57) ABSTRACT

A fuel cell device includes: a cell stack; a case including a cover portion that covers one of side surfaces of the cell stack along a stacking direction; an end plate connected to one end portion of the cover portion in the stacking direction; and a fastening member that extends in parallel with the stacking direction on an opposite side of the cell stack from the cover portion, that includes one end portion in the stacking direction connected to the end plate and another end portion in the stacking direction connected to the case, and that fastens the cell stack, the end plate, and the case to each other. A thermal expansion coefficient of the cover portion is larger than a thermal expansion coefficient of the fastening member.

6 Claims, 4 Drawing Sheets

(56) References Cited

FOREIGN PATENT DOCUMENTS

| JP | 2002-50393 | 2/2002 | |
|---|---|---|---|
| JP | 2009-146853 | 7/2009 | |
| JP | 2010-92870 | 4/2010 | |
| JP | 2013-12325 | 1/2013 | |
| JP | WO 2013001338 A1 * | 1/2013 | ............ H01M 8/248 |

* cited by examiner

FUEL CELL DEVICE

INCORPORATION BY REFERENCE

The disclosure of Japanese Patent Application No. 2014-225762 filed on Nov. 6, 2014 including the specification, drawings and abstract is incorporated herein by reference in its entirety.

BACKGROUND OF THE INVENTION

1. Field of the Invention

The invention relates to a fuel cell device.

2. Description of Related Art

Conventionally, a cell stack including a plurality of stacked unit cells is used in a fuel cell. The fuel cell including the cell stack is accommodated in a case in a state in which a load is applied to the cell stack in a stacking direction in order to maintain the stack structure of the cell stack. Japanese Patent Application Publication No. 2013-012325 (JP 2013-012325 A) describes a fuel cell device that includes a tension shaft disposed along a bottom surface of a cell stack in a state in which a fuel cell is accommodated in a case. One end of the tension shaft is fixed to a case side surface opposing an end surface of the cell stack in a stacking direction and the other end thereof is fixed to an end plate positioned on the opposite side of the cell stack from the above-mentioned case side surface, and the case, the cell stack, and the end plate are thereby fastened to each other.

In the fuel cell device described in JP 2013-012325 A, the case and the tension shaft are formed of a metal material of the same type such as steel. In addition, since the tension shaft is a rod member, the cross-sectional area of the tension shaft along a direction perpendicular to the stacking direction is smaller than the cross-sectional area of the case along the direction perpendicular to the stacking direction. Consequently, the rigidity of the tension shaft is lower than the rigidity of the case in the direction perpendicular to the stacking direction. Incidentally, the temperature of the cell stack increases during power generation, and the cell stack thermally expands and a compressive load increases. Accordingly, in the fuel cell device described in JP 2013-012325 A, with the increase of the compressive load, the dimensional change of the tension shaft having lower rigidity becomes larger than the dimensional change of the case having higher rigidity, and a fastening force on the side of the tension shaft (the side of the bottom surface) is reduced in the cell stack. With this, the side of the bottom surface of the cell stack expands in the stacking direction as compared with the side of an upper surface of the cell stack, and parallelism between unit cells is reduced. Thus, when the parallelism between the unit cells is reduced, surface pressures of the unit cells become uneven, and hence there is a possibility that power generation performance of the fuel cell device is lowered. To cope with this, a technique capable of preventing the reduction in parallelism between the unit cells when the temperature of the fuel cell device increases during power generation is desired.

SUMMARY OF THE INVENTION

The invention provides the fuel cell device capable of preventing the reduction in parallelism between the unit cells.

An aspect of the invention relates to a fuel cell device including: a cell stack including a plurality of unit cells that are stacked; a case including a cover portion that covers one of side surfaces of the cell stack, the side surfaces of the cell stack extending along a stacking direction along which the plurality of unit cells are stacked; an end plate connected to one end portion of the cover portion in the stacking direction and disposed on an outer side of the cell stack in the stacking direction; and a fastening member that extends in parallel with the stacking direction on an opposite side of the cell stack from the cover portion, that includes one end portion in the stacking direction connected to the end plate and another end portion in the stacking direction connected to the case, and that fastens the cell stack, the end plate, and the case to each other in the stacking direction. A thermal expansion coefficient of the cover portion is larger than a thermal expansion coefficient of the fastening member. According to the fuel cell device having the above configuration, since the thermal expansion coefficient of the fastening member is lower than the thermal expansion coefficient of the cover portion, in the case where the rigidity of the fastening member is lower than the rigidity of the cover portion, it is possible to reduce a difference in dimensional change in the stacking direction between the side of the fastening member and the side of the cover portion in the cell stack resulting from the difference in rigidity. Accordingly, it is possible to prevent the reduction in parallelism between the unit cells.

A cross-sectional area of the fastening member along a direction perpendicular to the stacking direction may be smaller than a cross-sectional area of the cover portion along the direction perpendicular to the stacking direction. According to the fuel cell device having the above configuration, in the case where the Young's modulus of the fastening member is equal to the Young's modulus of the cover portion, the rigidity of the cover portion is higher than the rigidity of the fastening member. However, with the difference in thermal expansion coefficient between the fastening member and the cover portion, it is possible to prevent the reduction in parallelism between the unit cells.

The case may be formed of aluminum, and the fastening member may be formed of iron. According to the fuel cell device having the above configuration, the thermal expansion coefficient of the case is about twice as large as the thermal expansion coefficient of the fastening member, and hence, even in the case where a difference in cross-sectional area between the fastening member and the cover portion is large, it is possible to reduce the difference in dimensional change. Consequently, it is possible to reduce the cross-sectional area of the fastening member, and prevent an increase in the size of the fuel cell device.

The fastening member may include a plurality of rod members disposed so as to be spaced apart from each other. According to the fuel cell device having the above configuration, since the fastening member include the plurality of the rod members disposed so as to be spaced apart from each other, it is possible to bear a larger compressive load of the cell stack as compared with a configuration in which the fastening member is formed of a plate member having the same cross-sectional area as that of the plurality of the rod members. In addition, it is possible to distribute the load efficiently as compared with a configuration in which the fastening member is constituted by one rod member, and it is possible to fasten the cell stack stably, reduce the cross-sectional area per rod member, and prevent the increase in the size of the fuel cell device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
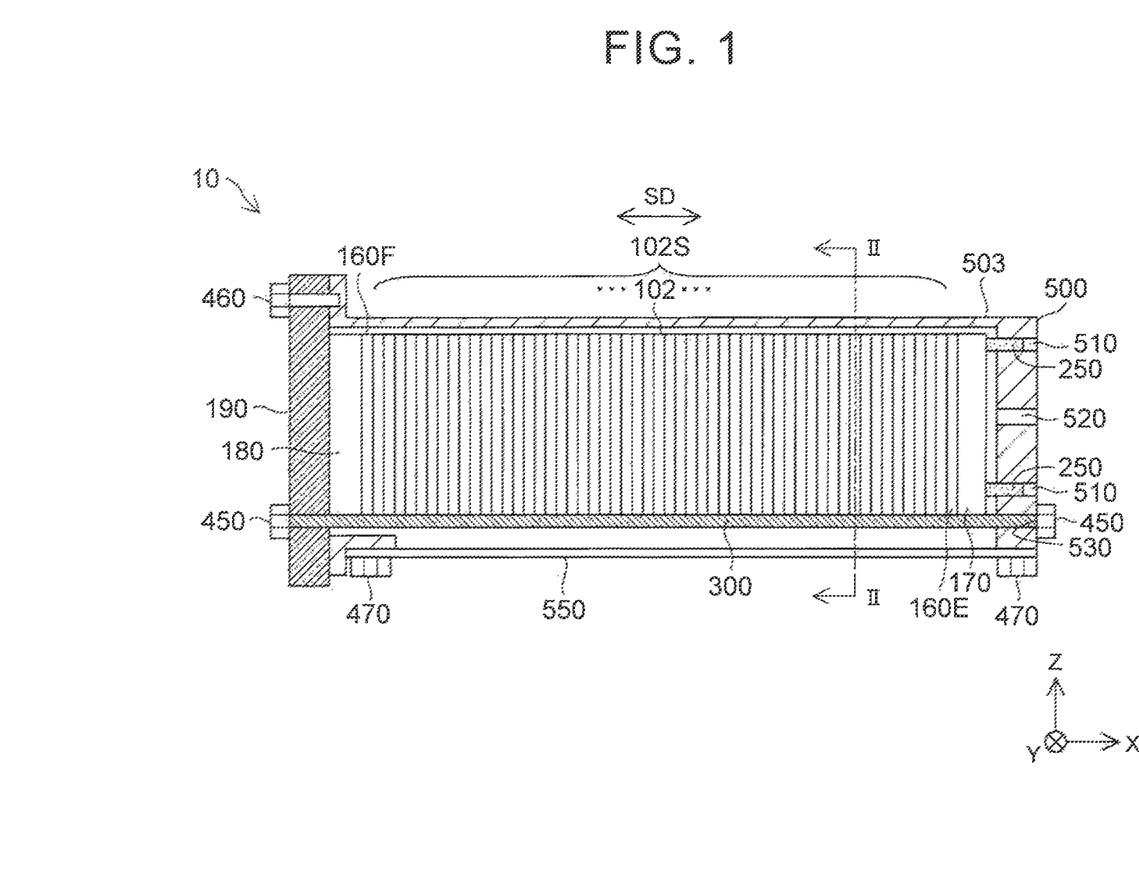
FIG. 1 is a sectional view showing a schematic configuration of a fuel cell device as an embodiment of the invention.
Figure 2:
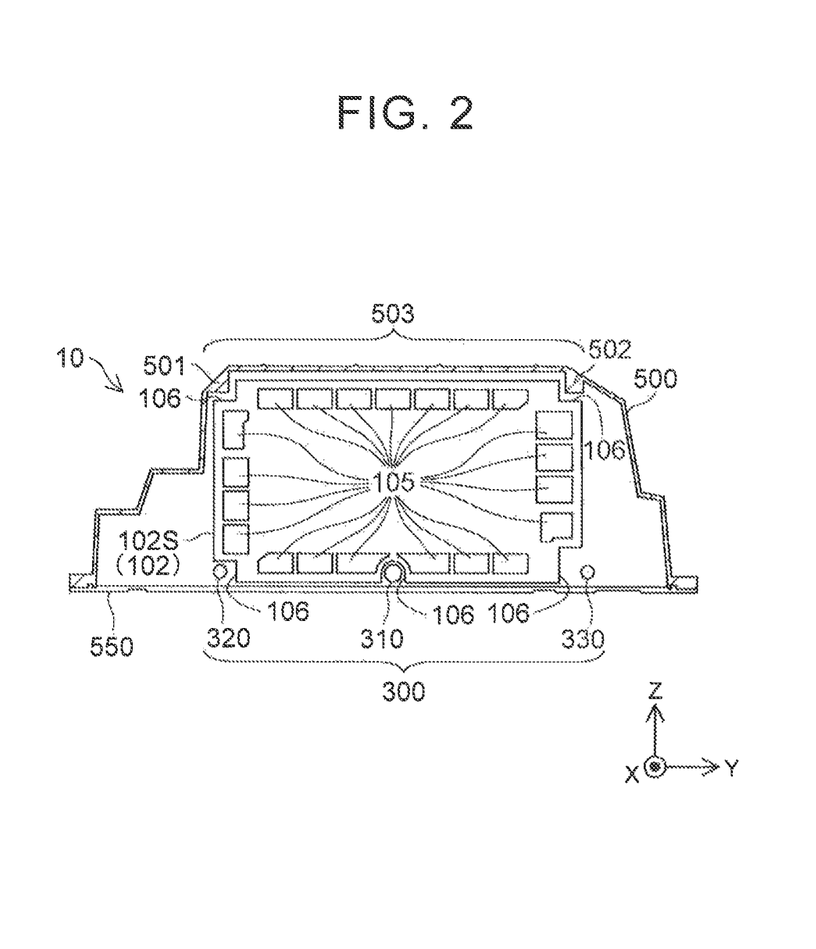
FIG. 2 is a cross-sectional view showing a cross section of the fuel cell device in a direction perpendicular to a stacking direction.

First, an embodiment of the invention will be described. FIG. 1 is a cross-sectional view showing a schematic configuration of a fuel cell device as the embodiment of the invention. FIG. 2 is a cross-sectional view showing a cross section of the fuel cell device in a direction perpendicular to a stacking direction. FIG. 2 shows a II-II cross section in FIG. 1. A fuel cell device 10 includes what is called a polymer electrolyte fuel cell, and constitutes a fuel cell system with a supply section of reactive gases (a fuel gas and an oxidizer gas), and a supply section of a cooling medium. Such a fuel cell system is mounted on a fuel cell vehicle or the like as, e.g., a system for providing a drive power source, and is used. Note that the fuel cell system may also be mounted on any other mobile unit instead of the fuel cell vehicle, and may also be used as a stationary fuel cell.

As shown in FIG. 1, the fuel cell device 10 includes a cell stack 102S, a first collector plate 160E, a second collector plate 160F, a pressure plate 170, a stack manifold 180, an end plate 190, a tension shaft 300, a case 500, and a lower cover 550.

The cell stack 102S has a structure in which a plurality of unit cells 102 are stacked along a stacking direction SD. The unit cell 102 includes a membrane electrode assembly (MEA), a pair of gas diffusion layers that hold the MEA between them, and a pair of separators that hold a layered body of the MEA and the gas diffusion layers between them. As shown in FIG. 2, the unit cell 102 has a plurality of flow path forming holes 105 that extend in a thickness direction. With this, the flow path (not shown) for supplying the reactive gas and the cooling medium to the unit cell 102 and the flow path (not shown) for discharging the reactive gas and the cooling medium from the unit cell 102 are formed along the stacking direction SD in the cell stack 102S. Note that, in this embodiment, an X axis and a Y axis are determined such that an X-Y plane is parallel to the horizontal plane. In addition, the Y axis and a Z axis are directions perpendicular to each other. A +Z direction corresponds to a vertically upper direction and a −Z direction corresponds to a vertically lower direction. As shown in FIG. 1, the fuel cell device 10 is placed such that the stacking direction SD is parallel to the X axis.

As shown in FIG. 2, the shape of the surface of the unit cell 102 perpendicular to the stacking direction SD is substantially rectangular, and the unit cell 102 is disposed such that its longitudinal direction is parallel to the Y axis. Concave portions 106 are formed at four corners of the substantially rectangular shape in a plan view and the center of the lower side. The concave portions 106 of each unit cell 102 are arranged in the stacking direction SD, and grooves along the stacking direction SD are thereby formed at boundaries between an upper surface and side surfaces of the cell stack 102S, boundaries between a bottom surface and the side surfaces thereof, and the center of the bottom surface. The grooves formed by the concave portions 106 at both corners of the upper side prevent protruding portions 501 and 502 of the case 500 from interfering with the unit cell 102, and the grooves formed by the concave portions 106 at both corners of the lower side and the groove formed by the concave portion 106 at the center of the lower side prevent the tension shaft 300 and a connector for connection with a voltage monitoring unit that is not shown from interfering with the unit cell 102.

As shown in FIG. 1, the first collector plate 160E is disposed so as to be in contact with an end surface of the cell stack 102S in a +X direction. In this embodiment, the first collector plate 160E has a three-layer structure in which a titanium layer, an aluminum layer, and the titanium layer are stacked, and an outer edge of the first collector plate 160E is covered with rubber. The second collector plate 160F is disposed so as to be in contact with an end surface of the cell stack 102S in a −X direction. Similarly to the unit cell 102 described above, the second collector plate 160F has a plurality of flow path forming holes that extend in the thickness direction. In this embodiment, the second collector plate 160F is formed of aluminum. Each of the first collector plate 160E and the second collector plate 160F collects electric power generated by each unit cell 102 and outputs the electric power to the outside from a terminal that is not shown. Note that, similarly to the first collector plate 160E, the second collector plate 160F may also be formed by the three-layer structure. In addition, the two collector plates 160E and 160F may also be formed of any conductive material other than aluminum and titanium. Note that each of the collector plates 160E and 160F has a substantially rectangular shape in a plan view similarly to the unit cell 102.

The pressure plate 170 is disposed on an outer side of the first collector plate 160E in the stacking direction SD (the +X direction). Note that an insulator (not shown) is disposed between the pressure plate 170 and the first collector plate 160E. The pressure plate 170 is fixed using a plurality of load adjustment screws 250 inserted into a plurality of through holes 510 formed in the case 500, and presses the cell stack 102S in the −X direction. Note that a thread is formed in an inner peripheral surface of each through hole 510, and the through hole 510 functions as a female thread. Note that, similarly to the unit cell 102, the pressure plate 170 has a substantially rectangular shape in a plan view.

The stack manifold 180 is disposed so as to be in contact with a surface of the second collector 160F in the −X direction. In the stack manifold 180, a flow path for supplying the reactive gas and the cooling medium to the cell stack 102S and a flow path for discharging the reactive gas and the cooling medium from the cell stack 102S are formed. Note that a circulation pipe and a gas-liquid separator are mounted to the stack manifold 180 as components of a fuel gas supply system.

The end plate 190 is disposed on an outer side of the cell stack 102S in the stacking direction SD, and is in contact with a surface of the stack manifold 180 in the −X direction. The end plate 190 is formed of aluminum, and covers an opening formed in a side surface of the case 500 in the −X direction. The end plate 190 is connected to an end portion of the tension shaft 300 using a plurality of nuts 450 in the vicinity of an end portion in the −Z direction. An end portion of the tension shaft 300 on the opposite side from the end portion connected to the end plate 190 is connected to the case 500 using the nut 450. Consequently, the end plate 190 is connected to the case 500 via the tension shaft 300. In addition, the end plate 190 is fixed to the case 500 using a plurality of bolts 460 in a portion around the opening formed in the side surface of the case 500 in the −X direction.

The tension shaft 300 is provided to extend in parallel with the stacking direction SD vertically below the cell stack 102S. In other words, the tension shaft 300 is disposed on the opposite side of the cell stack 102S from a side surface of the case 500 in the +Z direction (hereinafter also referred to as an upper surface portion 503). As shown in FIG. 2, the tension shaft 300 includes a first shaft 310, a second shaft 320, and a third shaft 330. Each of the first shaft 310, the second shaft 320, and the third shaft 330 has a circular cross section along the direction perpendicular to the stacking direction SD, and has a rod shape with a longitudinal direction along the stacking direction SD as an outer shape thereof. The first shaft 310 is accommodated in the groove formed along the stacking direction SD at the center of the bottom surface of the cell stack 102S. Each of the second shaft 320 and the third shaft 330 is accommodated in the groove formed along the stacking direction SD at the boundary between the bottom surface and the side surface of the cell stack 102S. The first shaft 310, the second shaft 320, and the third shaft 330 are disposed so as to be spaced apart from each other in a direction along the Y axis by a predetermined distance. The end portion of the tension shaft 300 in the −X direction is connected to the end plate 190 and the end portion thereof in the +X direction is connected to the case 500, whereby the cell stack 102S, the end plate 190, and the case 500 are fastened to each other, and the stack structure of the cell stack 102S is maintained. In this embodiment, the three shafts 310 to 330 constituting the tension shaft 300 are formed of iron. The diameter of the first shaft 310 is larger than the diameters of the second shaft 320 and the third shaft 330. Note that the diameter of the second shaft 320 is equal to the diameter of the third shaft 330.

The case 500 has a box shape as an outer shape thereof, and accommodates auxiliary equipment such as the voltage monitoring unit and the gas-liquid separator that are not shown in addition to the fuel cell including the cell stack 102S. The upper surface portion 503 of the case 500 has a plate shape as an outer shape thereof, and covers an upper surface of the cell stack 102S. The first protruding portion 501 that is provided to extend along the stacking direction SD is formed at an end portion of the upper surface portion 503 in a −Y direction. The first protruding portion 501 protrudes toward the cell stack 102S, and is accommodated in the groove formed at the boundary between the upper surface and the side surface of the cell stack 102S. The first protruding portion 501 prevents a positional displacement of each unit cell 102 in the direction perpendicular to the stacking direction SD. The second protruding portion 502 is different from the first protruding portion 501 in that the second protruding portion 502 is formed at an end portion of the upper surface portion 503 in a +Y direction, and other configurations are the same as those of the first protruding portion 501, and hence the detailed description thereof will be omitted. In this embodiment, the cross-sectional area of the upper surface portion 503 along the direction perpendicular to the stacking direction SD is larger than the cross-sectional area of the tension shaft 300 (i.e., the sum of the cross-sectional areas of the three shafts 310 to 330).

As shown in FIG. 1, openings are formed in the side surfaces of the case 500 in the −X direction and the −Z direction. The opening in the side surface in the −X direction is covered with the end plate 190. The opening in the side surface in the −Z direction is covered with the lower cover 550. The plurality of the through holes 510 described above, a pressing member insertion hole 520 for inserting a pressing member when the fuel cell device 10 is assembled, and three tension shaft insertion holes 530 for inserting the tension shaft 300 are formed in the side surface of the case 500 in the +X direction. Note that each of the other side surfaces of the case 500 (side surfaces in the +Y direction and the −Y direction) has a plate shape as an outer shape thereof. In this embodiment, the case 500 is formed of an aluminum die-cast.

The lower cover 550 is disposed vertically below the cell stack 102S, and covers the opening in the side surface of the case 500 in the −Z direction. The lower cover 550 is a plate member having a substantially rectangular shape in a plan view, has a size equal to that of the side surface of the case 500 in the −Z direction, and is fixed to the case 500 using a plurality of bolts 470. The lower cover 550 is formed of iron in this embodiment, but may also be formed of any other metal such as steel instead of iron.

In this embodiment, the tension shaft 300 functions as a fastening member, and each of the first shaft 310, the second shaft 320, and the third shaft 330 functions as a rod member. In addition, the upper surface portion 503 of the case 500 functions as a cover portion.

FIGS. 3A and 3B and FIGS. 4A and 4B are sectional views schematically showing assembly steps of the fuel cell device 10. FIGS. 3A and 3B and FIGS. 4A and 4B show the chronological assembly steps of the fuel cell device 10 in this order.

Figure 3A:
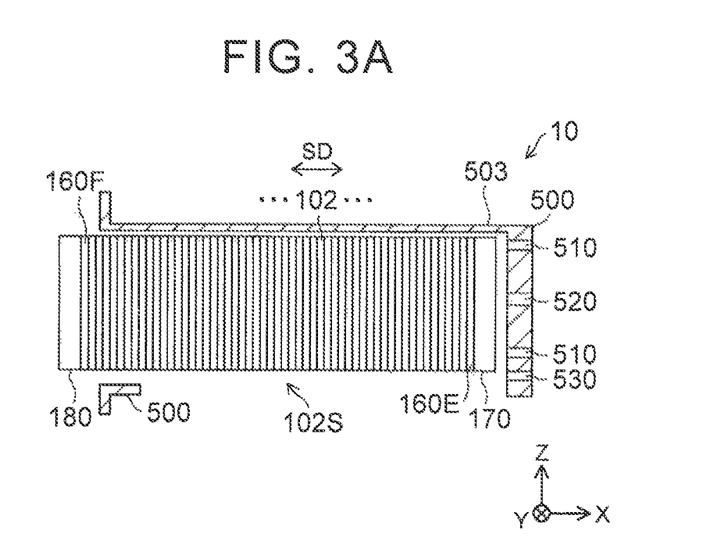
FIGS. 3A and 3B are sectional views schematically showing assembly steps of a fuel cell device 10.

As shown in FIG. 3A, the cell stack 102S, the two collector plates 160E and 160F, the pressure plate 170, and the stack manifold 180 are inserted into the case 500 from the opening formed in the case 500, and are disposed. In FIG. 3A, since the cell stack 102S is not compressed, part of the unit cells 102 on the side of an end portion in the −X direction in the cell stack 102S, the second collector plate 160F, and the stack manifold 180 are positioned on the outer side of the case 500 in the stacking direction SD.

Figure 3B:
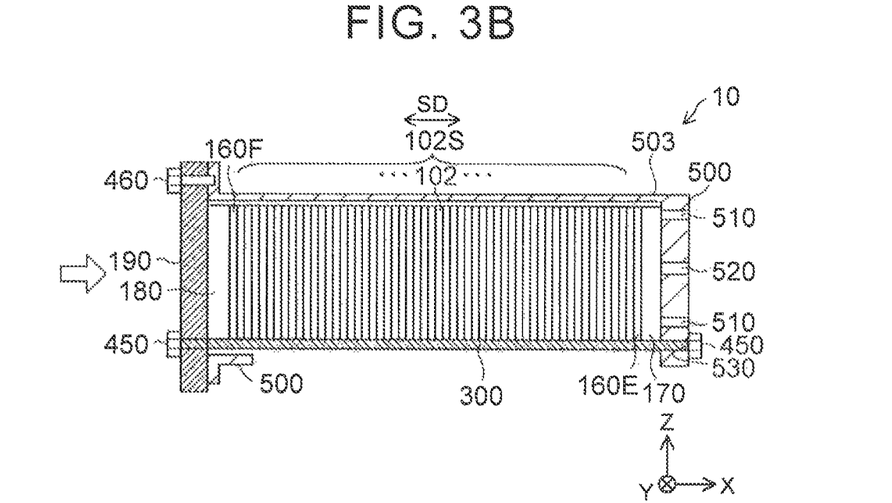

As shown in FIG. 3B, the end plate 190 is disposed so as to cover the opening formed in the side surface of the case 500 in the −X direction. At this point, the end plate 190 is pressed in a direction indicated by an open arrow in the drawing (the +X direction) by a pressurization unit that is not shown, and the cell stack 102S is compressed in the stacking direction SD. Next, the tension shaft 300 is inserted from the tension shaft insertion hole 530. The end portion of the tension shaft 300 in the −X direction is fixed to the end plate 190 using the nut 450, and the end portion thereof in the +X direction is fixed to the case 500. The end plate 190 is fixed to the case 500 using the plurality of the bolts 460. With the fixation of the end plate 190 to the case 500, the cell stack 102S that is compressed in the stacking direction SD is accommodated in the case 500.

Figure 4A:
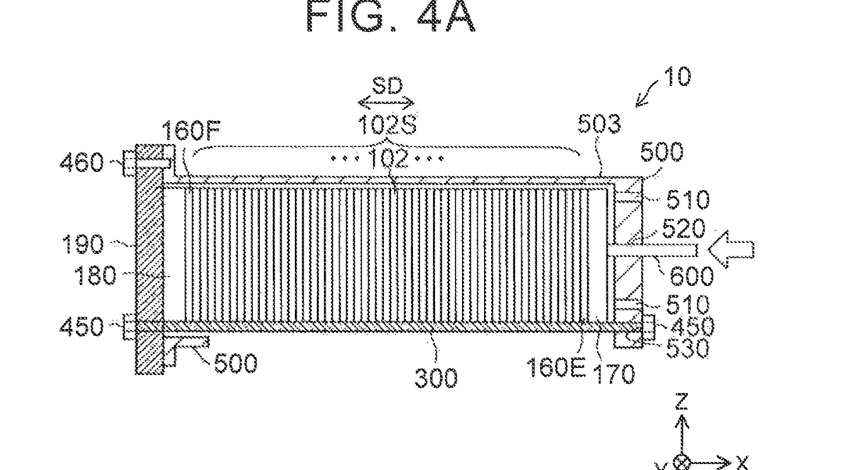
FIGS. 4A and 4B are sectional views schematically showing assembly steps of the fuel cell device 10.

As shown in FIG. 4A, a pressing member 600 is inserted from the pressing member insertion hole 520 formed in the side surface of the case 500 in the +X direction. The pressing member 600 is driven with power of the pressurization unit that is not shown, and presses the pressure plate 170 in a direction indicated by an open arrow in the drawing (the −X direction) with a predetermined load. With this pressing force, the pressure plate 170 presses the first collector plate 160E and the cell stack 102S. With this, the cell stack 102S is further compressed in the stacking direction SD.

Figure 4B:
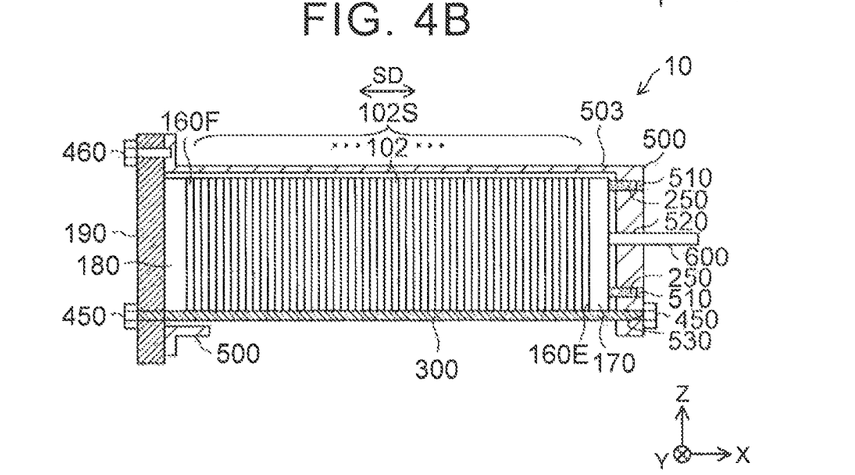

As shown in FIG. 4B, in a state in which the pressing force by the pressing member 600 is maintained, each load adjustment screw 250 is inserted into each through hole 510 in the side surface of the case 500 in the +X direction. The load adjustment screw 250 adjusts variations in the length of the cell stack 102S in the stacking direction SD. Accordingly, the load adjustment screw 250 is inserted until the load adjustment screw 250 comes into contact with the pressure plate 170. Since the pressure plate 170 is fixed using the load adjustment screw 250, the compressive load of the cell stack 102S is maintained at a predetermined level.

Next, the pressing member 600 is pulled out from the pressing member insertion hole 520, and a cover (not shown) is disposed at the pressing member insertion hole 520. Thereafter, the lower cover 550 is disposed at the opening in the side surface of the case 500 in the −Z direction, and the assembly of the fuel cell device 10 shown in FIG. 1 is completed.

As described above, the cell stack 102S is accommodated in the case 500 in the state in which the predetermined compressive load is maintained with the fastening force of the tension shaft 300. However, the temperature of the cell stack 102S increases during power generation, and hence the cell stack 102S expands in the stacking direction SD due to thermal expansion of each unit cell 102. Accordingly, during power generation, the compressive load of the cell stack 102S accommodated in the case 500 increases. Incidentally, in this embodiment, the cross-sectional area of the tension shaft 300 along the direction perpendicular to the stacking direction SD is smaller than the cross-sectional area of the upper surface portion 503 of the case 500. As a result, the rigidity of the tension shaft 300 based on the cross-sectional area is lower than the rigidity of the upper surface portion 503 based on the cross-sectional area. Consequently, with the increase of the compressive load of the cell stack 102S, the dimensional change of the tension shaft 300 in the stacking direction SD tends to be larger than the dimensional change of the upper surface portion 503 in the stacking direction SD. Therefore, the dimensional change on the side of the tension shaft 300 (the side of the bottom surface) in the cell stack 102S tends to be larger than the dimensional change on the side of the upper surface portion 503 (the side of the upper surface) in the cell stack 102S.

However, in the case of the fuel cell device 10 of this embodiment, the tension shaft 300 is formed of iron, and the upper surface portion 503 (the case 500) is formed of aluminum. In a temperature range in which the fuel cell device 10 is usually used (e.g., 0° C. to 100° C.), the thermal expansion coefficient of iron is $11.7 \times 10^{-6}/°$ C., and the thermal expansion coefficient of aluminum is $23 \times 10^{-6}/°$ C. Consequently, when the temperature of the cell stack 102S increases during power generation and the compressive load of the cell stack 102S increases, the expansion of the tension shaft 300 is suppressed as compared with the expansion of the upper surface portion 503. As a result, it is possible to reduce the difference in dimensional change resulting from the difference in rigidity described above, and prevent a reduction in parallelism between the unit cells 102 constituting the cell stack 102S. Consequently, it is possible to prevent surface pressures of the unit cells 102 from becoming uneven, and prevent a reduction in the power generation performance of the fuel cell device 10. Note that the "parallelism" mentioned above means the degree of parallel between the unit cells 102 when the unit cells 102 are stacked along the stacking direction SD.

In addition, since aluminum has the thermal expansion coefficient that is about twice the thermal expansion coefficient of iron, in this embodiment, the thermal expansion coefficient of the upper surface portion 503 (the case 500) is sufficiently larger than the thermal expansion coefficient of the tension shaft 300. Consequently, when the temperature of the cell stack 102S increases during power generation and the compressive load of the cell stack 102S increases, it is possible to suppress the dimensional change of the tension shaft 300 in the stacking direction SD sufficiently as compared with the dimensional change of the upper surface portion 503 in the stacking direction SD. Therefore, it is possible to reduce the cross-sectional area of the tension shaft 300, i.e., thinly form the tension shaft 300, and hence it is possible to prevent an increase in the size of the fuel cell device 10. In addition, the tension shaft 300 of this embodiment includes the three shafts 310 to 330. Accordingly, it is possible to distribute the load efficiently as compared with a configuration in which the tension shaft 300 is constituted by one shaft, and stably fasten the cell stack 102S, the end plate 190, and the case 500 to each other. In addition, it is possible to reduce the cross-sectional area per shaft, and prevent the increase in the size of the fuel cell device 10. Further, it is possible to bear a larger compressive load of the cell stack as compared with a configuration in which the fastening member is formed of a plate member having the same cross-sectional area as that of a plurality of shafts. In addition, after the tension shaft 300 is disposed, it is possible to dispose other components in the case 500 from between the individual shafts 310 to 330, from between the second shaft 320 and the case 500, and from between the third shaft 330 and the case 500. As a result, it is possible to improve the workability of the assembly of the fuel cell device 10 as compared with a configuration in which the fastening member is formed of one plate member.

Hereinbelow, modifications of the embodiment of the invention will be described. In the above-described embodiment, the tension shaft 300 is formed of iron and the upper surface portion 503 (the case 500) is formed of aluminum, but the invention is not limited thereto. In the case where the thermal expansion coefficient of the material forming the upper surface portion 503 is larger than the thermal expansion coefficient of the material forming the tension shaft 300, at least one of the upper surface portion 503 and the tension shaft 300 may also be formed of any material other than the materials in the above-described embodiment. For example, the upper surface portion 503 may be formed of aluminum (thermal expansion coefficient: $23 \times 10^{-6}/°$ C.), and the tension shaft 300 may be formed of martensite stainless steel (thermal expansion coefficient of SUS410: $9.9 \times 10^{-6}/°$ C.) or titanium (thermal expansion coefficient: $8.4 \times 10^{-6}/°$ C.). In addition, for example, the upper surface portion 503 may be formed of austenitic stainless steel (thermal expansion coefficient of SUS304: $17.3 \times 10^{-6}/°$ C.), and the tension shaft 300 may be formed of iron (thermal expansion coefficient: $11.7 \times 10^{6}/°$ C.) or martensite stainless steel (thermal expansion coefficient of SUS410: $9.9 \times 10^{-6}/°$ C.). With such configurations as well, effects similar to those of the fuel cell device 10 of the embodiment are achieved. Note that, in order to suppress the dimensional change of the tension shaft 300 in the stacking direction SD sufficiently as compared with the dimensional change of the upper surface portion 503 in the stacking direction SD, the upper surface portion 503 is preferably formed of the material having the thermal expansion coefficient sufficiently larger than that of the tension shaft 300. For example, the thermal expansion coefficient of the material forming the upper surface portion 503 is preferably 1.2 or more times larger than the thermal expansion coefficient of the material forming the tension shaft 300, more preferably 1.5 or more times larger than the thermal expansion coefficient thereof, and even more preferably 1.8 or more times larger than the thermal expansion coefficient thereof.

In addition, in the above-described embodiment, the case 500 is formed of the single material, but the upper surface portion 503 and the other portion of the case 500 may also be formed of different materials. In such a configuration as well, by having the thermal expansion coefficient of the upper surface portion 503 larger than the thermal expansion coefficient of the tension shaft 300, effects similar to those of the fuel cell device 10 of the embodiment are achieved. That is, in general, the cover portion having the thermal expansion coefficient larger than the thermal expansion coefficient of the fastening member may be used in the fuel cell device 10 of the invention.

In the above-described embodiment, in the tension shaft 300, the first shaft 310, the second shaft 320, and the third shaft 330 are formed of iron, but the invention is not limited thereto. At least one of the first shaft 310, the second shaft 320, and the third shaft 330 may also be formed of a different material. In such a configuration, the thermal expansion coefficient of the tension shaft 300 means the average value of the individual thermal expansion coefficients of the three shafts 310 to 330. In this configuration as well, the thermal expansion coefficient of the tension shaft 300 is smaller than the thermal expansion coefficient of the upper surface portion 503. Note that the individual thermal expansion coefficients of the first shaft 310, the second shaft 320, and the third shaft 330 are preferably smaller than the thermal expansion coefficient of the upper surface portion 503.

The configuration of the tension shaft 300 in the above-described embodiment is merely an example, and various changes can be made. For example, the tension shaft 300 may also include two or more first shafts 310 that are accommodated in the groove formed along the stacking direction SD in the bottom surface of the cell stack 102S. In addition, the tension shaft 300 may also include two or more second shafts 320 and two or more third shafts 330 that are accommodated in the grooves formed along the stacking direction SD at the boundaries between the bottom surface and the side surfaces of the cell stack 102S. Further, one or two of the first shaft 310, the second shaft 320, and the third shaft 330 may also be omitted.

In addition, the first shaft 310, the second shaft 320, and the third shaft 330 are disposed so as to be spaced apart from each other in the direction along the Y axis by the predetermined distance, but the first shaft 310, the second shaft 320, and the third shaft 330 may not be disposed so as to be arranged in the direction along the Y axis, and may also be disposed so as to be in contact with each other.

Further, each of the cross-sectional shape of the first shaft 310, the cross-sectional shape of the second shaft 320, and the cross-sectional shape of the third shaft 330 is circular, but the cross-sectional shape thereof may also be any other cross-sectional shape such as an oblong shape or a polygonal shape instead of the circular shape. In addition, at least one of the first shaft 310, the second shaft 320, and the third shaft 330 may have a different cross-sectional shape.

Furthermore, in the embodiment, the diameter of the first shaft 310 is larger than the diameters of the second shaft 320 and the third shaft 330, but the diameter of the first shaft 310 may also be equal to or smaller than the diameters of the second shaft 320 and the third shaft 330. Moreover, the diameter of the second shaft 320 may be different from the diameter of the third shaft 330. Additionally, the tension shaft 300 may also be formed of one plate member. In this configuration as well, in the case where the cross-sectional area of the tension shaft 300 is smaller than the cross-sectional area of the upper surface portion 503, and the rigidity of the tension shaft 300 is lower than the rigidity of the upper surface portion 503, it is possible to reduce the difference in dimensional change in the stacking direction SD between the side of the tension shaft 300 and the side of the upper surface portion 503 in the cell stack, and prevent the reduction in parallelism between the unit cells 102. However, the configuration in which the tension shaft 300 is formed of a plurality of the rod members (the first shaft 310, the second shaft 320, and the third shaft 330) is preferable in the point that the configuration can bear a larger compressive load of the cell stack 102S as compared with the configuration in which the tension shaft 300 is formed of the plate member having the same cross-sectional area as that of the plurality of the rod members.

In the above-described embodiment, the upper surface portion 503 includes the first protruding portion 501 and the second protruding portion 502 that are provided to extend along the stacking direction SD, but the invention is not limited thereto. At least one of the two protruding portions 501 and 502 may be omitted, and a plurality of the protruding portions 501 and 502 may be provided at the end portion in the −Y direction and at the end portion in the +Y direction.

In the above-described embodiment, the cross-sectional area of the tension shaft 300 along the direction perpendicular to the stacking direction SD is smaller than the cross-sectional area of the upper surface portion 503, but the invention is not limited thereto. In a configuration in which the Young's modulus of the material forming the tension shaft 300 is smaller than the Young's modulus of the material forming the upper surface portion 503, the cross-sectional area of the tension shaft 300 along the direction perpendicular to the stacking direction SD may be equal to or larger than the cross-sectional area of the upper surface portion 503. For example, the case 500 may be formed of austenitic stainless steel (Young's modulus of SUS304: 197 GPa), and the tension shaft 300 may be formed of titanium (Young's modulus: 106 GPa). In this configuration as well, the rigidity of the tension shaft 300 can be lower than the rigidity of the upper surface portion 503. In this case as well, it is possible to reduce the difference in dimensional change between the tension shaft 300 and the upper surface portion 503, and hence it is possible to reduce the difference in dimensional change in the stacking direction SD between the side of the tension shaft 300 and the side of the upper surface portion 503 in the cell stack 102S, and prevent the reduction in parallelism between the unit cells 102.

The invention is not limited to the embodiment and the modifications described above, and the invention can be implemented in various configurations without departing from the scope thereof. For example, the technical features in the embodiment and the modifications corresponding to the technical features of the invention can be appropriately replaced or combined in order to solve a part or all of the above problems or achieve a part or all of the above effects. In addition, any of the technical features, if not explained as essential in this specification, may be deleted as appropriate.

Further, the invention can be implemented in various forms. For example, the invention can be implemented in forms such as a fuel cell system including the fuel cell device, and a vehicle on which the fuel cell system is mounted.

What is claimed is:
1. A fuel cell device comprising:
a cell stack including a plurality of unit cells that are stacked;
a case including a cover portion that covers one of side surfaces of the cell stack, the side surfaces of the cell stack extending along a stacking direction along which the plurality of unit cells are stacked;

an end plate connected to one end portion of the cover portion in the stacking direction and disposed on an outer side of the cell stack in the stacking direction; and a fastening member that extends in parallel with the stacking direction on an opposite side of the cell stack from the cover portion, that includes one end portion in the stacking direction connected to the end plate and another end portion in the stacking direction connected to the case, and that fastens the cell stack, the end plate, and the case to each other and compresses the cell stack, the end plate, and the case in the stacking direction, wherein a thermal expansion coefficient of the cover portion is larger than a thermal expansion coefficient of the fastening member, and a rigidity of the fastening member is lower than a rigidity of the cover portion.

2. The fuel cell device according to claim 1, wherein a cross-sectional area of the fastening member along a direction perpendicular to the stacking direction is smaller than a cross-sectional area of the cover portion along the direction perpendicular to the stacking direction.

3. The fuel cell device according to claim 1, wherein:
the case is formed of aluminum; and
the fastening member is formed of iron.

4. The fuel cell device according to claim 1, wherein the fastening member includes a plurality of rod members disposed so as to be spaced apart from each other.

5. The fuel cell device according to claim 1, wherein the cover portion includes a protruding portion formed at an end portion of the cover portion that protrudes toward the cell stack.

6. The fuel cell device according to claim 2, wherein the cover portion includes a protruding portion formed at an end portion of the cover portion that protrudes toward the cell stack.

* * * * *